United States Patent [19]
Wojcik

[11] 3,735,487
[45] May 29, 1973

[54] CORN-ON-THE-COB BUTTERER

[76] Inventor: Joseph D. Wojcik, 128 Solon Road, Bedford, Ohio 44146

[22] Filed: May 15, 1972

[21] Appl. No.: 253,558

[52] U.S. Cl.....................................30/124, 401/12
[51] Int. Cl. ..............................................B26b 11/00
[58] Field of Search...............................118/13, 76; 401/9-12; 30/124

[56] References Cited

UNITED STATES PATENTS

| | | | |
|---|---|---|---|
| 1,494,018 | 5/1924 | Randolph | 30/124 |
| 2,814,868 | 12/1957 | Wellinger | 30/124 |
| 3,005,225 | 10/1961 | Faust et al. | 401/12 |
| 3,031,712 | 5/1962 | Wilson | 401/12 |
| 3,449,829 | 6/1969 | Mattinson | 30/124 |

*Primary Examiner*—Morris Kaplan
*Attorney*—Harold F. McNenny, Donald W. Farrington, John F. Pearne et al.

[57] ABSTRACT

A device for applying butter to corn-on-the-cob is disclosed. The device includes a base having a pair of spaced, parallel blades projecting therefrom and a multiplicity of relatively stiff, butter-impaling bristles located between the blades. The blades and bristles terminate at an imaginary cylindrical surface with the blades being parallel to a straight line generatrix of the surface so that the blades and bristles conform to the surface of an ear of corn. To apply butter to an ear of corn, the bristles are forced downwardly into a butter pat so that the pat is retained by the device. Preferably the bristles are formed from a relatively poor heat conducting material so that the butter is melted by contact with the ear of corn and unmelted butter is retained by the bristles so that only a preselected amount of butter is applied to the corn. The blades facilitate removal of a pat of butter from a plate and prevent the butter from running down the cylindrical surfaces of the corn during use.

4 Claims, 4 Drawing Figures

PATENTED MAY 29 1973
3,735,487
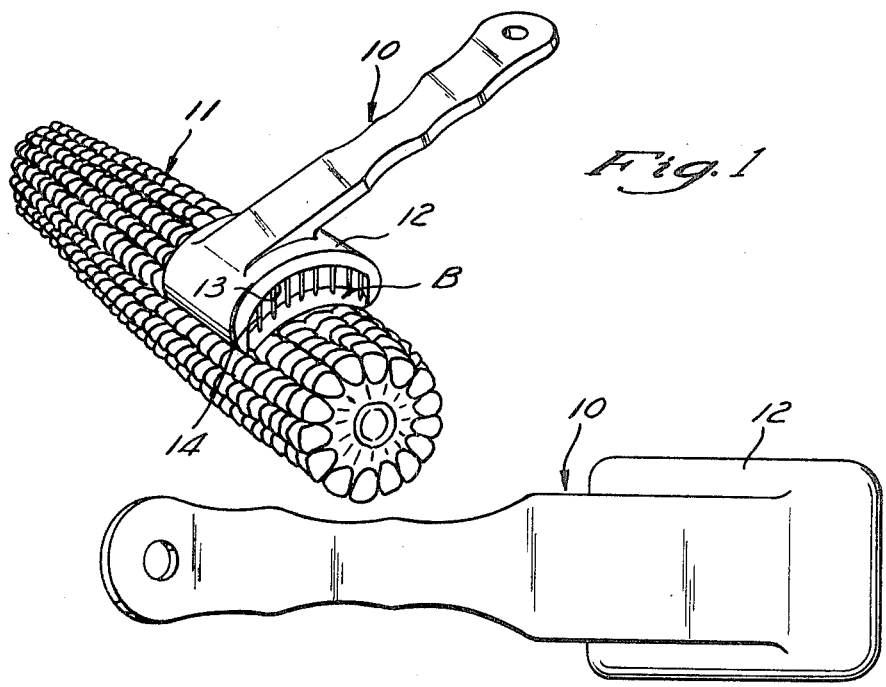
Fig. 1
Fig. 2
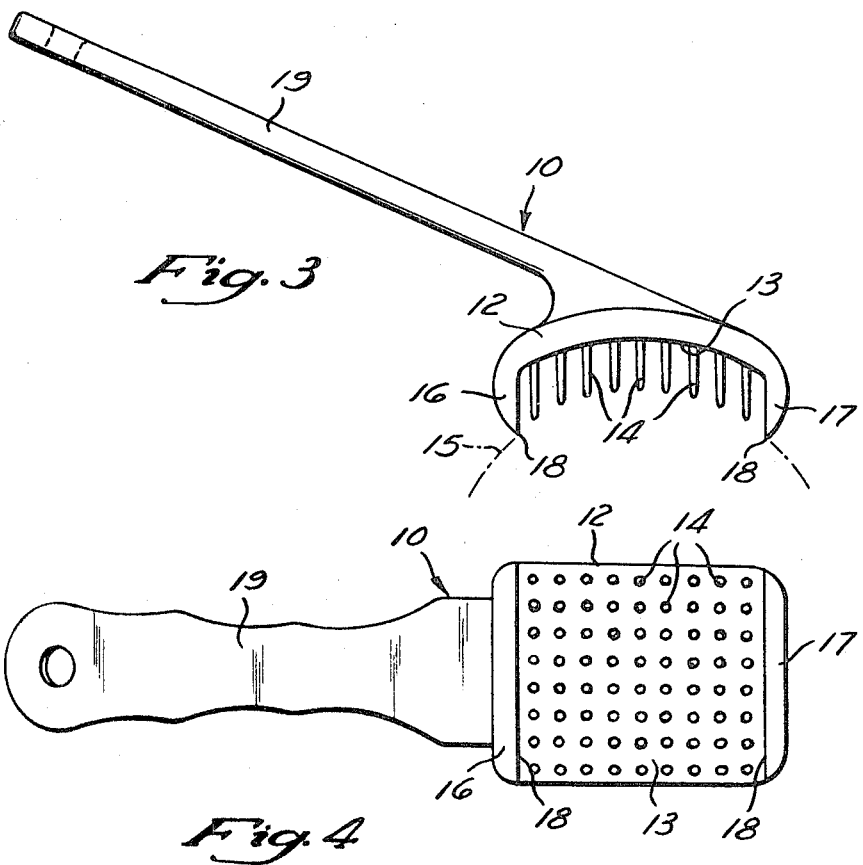
Fig. 3
Fig. 4

CORN-ON-THE-COB BUTTERER

BACKGROUND OF THE INVENTION

The invention relates to corn-on-the-cob butterers and, more particularly, to a corn butterer that transfers solid butter to an ear of corn so that the butter is melted by the heat from the corn. Various devices have been proposed for such a purpose. For example, in U. S. Pat. No. 3,005,225 there is disclosed a device for applying butter to corn-on-the-cob which includes an arcuate body portion having a smooth corn engaging concave surface and a convex surface having a plurality of teeth thereon to scrape butter from a stick and to provide reservoirs for the butter. Although this device has proved to be commercially acceptable, it is somewhat inconvenient to use in that relatively little butter is scraped and stored by the teeth. Furthermore, it is difficult to employ this device to scrape a single pat of butter and since a scraping action is employed it may be necessary to retain the stick or pat of butter on the plate by holding it with one's fingers.

Another example of a device for applying butter to an ear of corn may be found in U. S. Pat. No. 2,527,149 wherein the patentee discloses a box-like butter reservoir having perforations in the corn engaging portion of the reservoir. According to this patent, heat from the corn is transferred to a piece of butter within the reservoir to melt the butter and permit it to drip through the reservoir perforations. Such a deivce, is difficult to clean in that butter may harden within the perforations so that care must be taken in cleaning the device. Furthermore, butter must be transferred manually to the reservoir, thus making the device somewhat cumbersome.

Other commercially available corn buttering devices include brushes having relatively flexible bristles to apply the butter. However, such devices require that the butter be softened or melted so that the brush will pick up the butter. Obviously such devices are difficult to clean.

SUMMARY OF THE INVENTION

A corn-on-the-cob butterer according to this invention includes a base member having a plurality of relatively stiff, butter-impaling bristles projecting therefrom. These bristles terminate at an imaginary cylinder corresponding to the shape of an average ear of corn. Also projecting from the base is a pair of parallel blades which confine the bristles on two sides and which project to the imaginary cylindrical surface. The blades tend to retain the butter in place on the corn and also facilitate the removal of a pat of butter from a plate.

A pat of butter may be easily picked up by the device by forcing the bristles downwardly into the pat and then removing the pat from the plate. The butter will impaled by the bristles and held thereby in a corn buttering position. As the ear of corn is buttered, heat from the corn will slowly melt the butter in a progressive manner. Preferably, the bristles are made from a relatively poor heat conducting material so that the butter is melted by surface contact with the corn rather than by conduction through the bristles.

BRIEF DESCRIPTION OF THE DRAWINGS

FIG. 1 is a perspective view of a corn-on-the-cob buttering device according to this invention showing the device in use.

FIG. 2 is a top plan view of the device.

FIG. 3 is a side elevational view of the device.

FIG. 4 is a bottom plan view of the device.

DETAILED DESCRIPTION OF THE INVENTION

Referring now to the drawing there is illustrated a device 10 which is adapted to pick up and apply a pat of butter B to an ear of corn 11. The device 10 includes a curved base portion 12 having a convex bottom surface 13 from which a multiplicity of relatively stiff, butter-impaling bristles 14 project. In the illustrated embodiment of the invention, the bristles 14 have equal length and terminate at an imaginary cylinder 15. The bristles 14 are located between a pair of blades 16 and 17 which also terminate at the imaginary cylinder 15 and which have edges 18 parallel to a generatrix of the cylinder.

The device 10 also includes an integral, angularly related handle 19 which facilitates proper positioning of the device on an ear of corn.

To butter an ear of corn, the bristles 14 are pressed downwardly into a pat of butter so that the butter is impaled by the bristles 14 and is located between the blades 16 and 17. The blades 16 and 17 facilitate removal of the pat of butter from the plate when the user scrapes the edges 18 across the plate. With the butter impaled on the bristles 14, the device is brought into contact with an ear of corn and is moved across the corn in an axial direction. Preferably the device 10, and at least the bristles 14, are made from a relatively poor heat conducting material such as nylon to minimize heat conduction from the bristles to the butter. Thus the butter tends to remain impaled by the bristles and is melted substantially solely by surface contact. During the buttering operation, the blades 16 and 17 tend to confine the butter and prevent it from running downwardly along the corn.

Since a pat of butter is 1 ¼ inches square and about ¼ inch thick it has been found that the base 12 should be about 2 inches long by 1 ½ inches wide. Furthermore, it has been found that the bristles 14 should preferably be about ⅜ inch long and with a spacing between the bristles of about ⅛ inch. If the bristles are spaced too far apart they will not effectively impale and retain the butter. If on the other hand the bristles are too close together the device will be difficult to clean and the butter may not be readily melted by the heat of the corn.

The invention is not restricted to the slavish imitation of each and every detail set forth above. Obviously devices may be provided which change, eliminate, or add certain details without departing from the scope of the invention.

What is claimed is:

1. A corn-on-the-cob butterer comprising a base, a multiplicity of relatively stiff, butter-impaling bristles projecting from said base and terminating at an imaginary cylindrical surface, a pair of impervious blades projecting from said base having edges terminating at said imaginary cylindrical surface, said edges being parallel to a straight line generatrix of said surface, and said bristles being located between said blades.

2. A corn-on-the-cob butterer according to claim 1 wherein said base has a handle projecting therefrom.

3. A corn-on-the-cob butterer according to claim 1 wherein said bristles are relatively poor conductors of heat.

4. A corn-on-the-cob butterer according to claim 1 wherein said bristles are nylon.

* * * * *